United States Patent [19]

Günthner

[11] Patent Number: 4,936,891
[45] Date of Patent: Jun. 26, 1990

[54] PROCESS AND APPARATUS FOR THE VERTICAL DRAWING OF GLASS TUBES WITH SEALED BOTTOMS

[75] Inventor: Franz Günthner, Mainz, Fed. Rep. of Germany

[73] Assignee: Schott Glaswerke, Mainz, Fed. Rep. of Germany

[21] Appl. No.: 291,033

[22] Filed: Dec. 28, 1988

[30] Foreign Application Priority Data

Dec. 29, 1987 [DE] Fed. Rep. of Germany ....... 3744369

[51] Int. Cl.$^5$ .............................................. C03B 15/18
[52] U.S. Cl. .......................................... 65/87; 65/88; 65/188; 156/244.18
[58] Field of Search ................... 65/68, 70, 81, 87, 88, 65/176, 188; 156/156, 165, 198, 244.15, 244.18, 296

[56] References Cited

U.S. PATENT DOCUMENTS

| | | | |
|---|---|---|---|
| 1,766,638 | 6/1930 | Howard | 65/87 X |
| 1,892,126 | 12/1932 | Bailey | 65/187 X |
| 2,150,017 | 3/1939 | Barnard | 65/187 X |
| 2,172,899 | 9/1939 | Barnard | 65/187 X |
| 2,390,926 | 12/1945 | Danner | 65/87 X |
| 3,554,828 | 1/1971 | Schnedding et al. | 156/198 X |
| 3,666,583 | 5/1972 | Pei | 156/198 X |
| 3,852,053 | 12/1974 | Einramhof et al. | 65/70 X |
| 4,525,194 | 6/1985 | Rudoi | 65/187 X |

FOREIGN PATENT DOCUMENTS 1596702 7/1970 Fed. Rep. of Germany.
1596373 2/1971 Fed. Rep. of Germany.
3341313 5/1985 Fed. Rep. of Germany.

Primary Examiner—Robert L. Lindsay
Attorney, Agent, or Firm—Millen, White & Zelano

[57] ABSTRACT

A process for the vertical drawing of glass tubes, optionally with safety strips, sealed bottoms, and, if desired, a pressure equalizing aperture wherein specific tube lengths are severed in succession from a continuous glass tube rod. The glass tube rod, closed at its beginning and exiting through a feeder head from a vessel which contains molten glass, is introduced, being under atmospheric pressure in the interior of the glass tube rod, in the still plastic condition into a pressure tank located downstream of the feeder head where the glass tube rod is exposed to a defined pressure and is conducted on a non-plastic condition out of the pressure tank by drawing. Thereafter, by heating the glass tube rod at an interval after leaving the pressure tank, a specific tube length is severed from the continuous glass tube rod essentially simultaneously with the formation of bottoms that seal the melted-off tube length and the continuous glass tube rod.

16 Claims, 8 Drawing Sheets

4,936,891

PROCESS AND APPARATUS FOR THE VERTICAL DRAWING OF GLASS TUBES WITH SEALED BOTTOMS

BACKGROUND OF THE INVENTION

The present invention relates to a process for vertically drawing glass tubes, optionally with safety strips, sealed bottoms, and, if desired, an equalizing aperture. These glass tubes serve as basic tubes in the manufacture of ampoules and tubular vials.

Ampoules and vials are predominantly made from glass tubes produced in a continuous fashion. Various methods exist in connection with the continuous manufacture of glass tubes; these can be divided into two groups:

(a) Methods with a revolving blowing tube

1. Danner Process:
The glass is drawn off in the horizontal direction from the outer surfaces of a revolving blowing tube. The glass melt is fed on a slightly inclined tube drawing device onto a revolving blowing tube, and compressed air is blown into the interior of the thus-forming glass sleeve by way of the perforated shaft carrying the blowing tube. The tube is drawn and conveyed on a roller conveyor to a cutting device.

2. Philips Process:
The glass is drawn in the horizontal direction from the inner surface of a blowing tube.

(b) Methods with a drawing die 1. process by Maetz-Schuller, Corning, Koroljow and Shapiro: drawing of the glass tube takes place vertically upwardly. By blowing in air via a nozzle, the still plastic glass tube is prevented from collapsing.

2. In the Vello, Hanlein and Corning overflow method, the glass tube is drawn from the melt via the nozzle vertically in the downward direction.

A glass tube is drawn in accordance with one of the aforedescribed methods for the production of parent tubes for the manufacture of ampoules and tubular vials. A tube length is severed from the continuous glass tube rod and then one of the two open ends is softened and drawn out by means of a force acting in the axial direction until the tube collapses and a first bottom has been produced. Thereafter, a small opening is provided in the tube wall or in the tube bottom, and the second open end is sealed by a second bottom. During the severing step, taking generally place by a breaking-off procedure, it can never be entirely avoided that shards are formed and, enhanced by the flowing air in the tube, enter the interior of the tube to such a degree that they can no longer be removed even by melting off the ends. Thus, these shards enter the vials or ampoules produced from the tube during this method as well, and contaminate the liquid dispensed therein. The weight of the tube ends to be melted off is about 5–10% of that of the broken-off tube. The shards produced therein are re-used, it is true, but additional expense is encountered in recycling which, in the final analysis, makes the product more costly.

In addition, the methods utilized for the manufacture of these tubes exhibit decisive drawbacks which will be discussed in a representative fashion herein, using as an example the Danner method which is the most popular. The glass must be wound up on a blowing tube which is arranged in a blowing tube furnace. During this step, bubbles are easily formed. On the surface of the glass rod between a feeder and the blowing tube, portions of the glass are selectively vaporized, for example $B_2O_3$ and $Na_2O$; the remaining glass is enriched with $SiO_2$, and during reheating after the winding up step, small crystals are formed. These occur in a stripe configuration within the glass, are called drawing streaks, and increase the rejects. The blowing tube is eroded especially at the windup point and must be exchanged at intervals of several weeks. The resultant interruption in production lasts about one day. In order to prevent the glass, under the given viscosity conditions, from accumulating too greatly on the underside of the blowing tube, the latter must have a minimum number of revolutions. The glass tube may establish contact only in the solid conditions so that it is not deformed The thus-produced sag between the blowing tube end and first support is the cause of the following disturbances:

The tube diameter changes with a change in the flow of the ambient air. Controlling this interference, for example by shielding, is difficult and impedes free access to the drawing operation.

On account of the required revolution of the blowing tube, the glass tube becomes helical. Even if an attempt is made to compensate for the rotation of the blowing tube by turning the tube rod in the drawing machine, this cannot be entirely accomplished. A disadvantageous effect is thereby encountered especially in case of relatively large glass tube diameters and a slow drawing speed. Therefore, the drawing speed cannot be reduced arbitrarily. As a consequence, some measures, such as, for example, the melting off step, cannot be effected directly at the drawing site but only thereafter at great expense. To prevent, during breakoff, an excessive number of shards from forming, the glass tube is to be expanded at least partially. For this reason, and because the tube must be cooled into the proximity of the transformation region for the breaking off step, a long drawing line is required. The latter, in turn, needs a large building. At the high drawing speed, severing can only be accomplished by breaking off and/or mechanical pinching off. Thereby, shards are produced which, in part, are transported by the air flow into the interior of the tube by such a distance that they can no longer be eliminated even by the severing of the tube ends.

In case identification safety strips are to be incorporated in the products manufactured according to the conventional methods, these strips must be placed either manually or mechanically in individual sections onto the glass on the blowing tube. Thereby, overlapping zones are either produced, i.e., tubes having two strips, or gaps are formed, i.e., tubes without strips. These are not usable for high-quality products.

In case of trouble, resumption of operation of the drawing process is difficult and time-consuming. The entire system of liquid glass to the finished product requires a complex, expensive total installation.

SUMMARY OF THE INVENTION

In view of the aforementioned difficulties, it is an object of the present invention to provide a process for the manufacture of glass tubes of the type mentioned hereinabove wherein no shards and no process-originated glass wastes are formed, which process permits a simple design of the diameter of the tube to be manufactured, and makes it possible for the installation to be utilized to have a simple total structure. In particular, it is possible by means of the process to manufacture tubes having an equivalent quality as compared with the conventional methods, but at less expense.

It is also an object of the present invention to make available an apparatus for performing the process wherein especially the cost for the buildings that are to house the apparatus is relatively low, and placing the apparatus on stream again after trouble is readily accomplished. However, in particular, the apparatus exhibits a long service lifetime.

The novel process avoids the above-described disadvantages and affords further advantages. In particular, it is, of course, possible by means of the process of this invention to produce not only relatively short tube sections but also to apply the safety strips in an "endless" fashion while avoiding the known drawbacks of the state-of-the-art.

While the glass tube rod is pulled through the feeder head, the rod is provided with a safety strip in a simple way by fusing a colored enamel at a location within the feeder head into the passing glass tube rod.

It is also readily possible to draw several tube rods, e.g., 10, in close juxtaposition, for example, at a respective distance of 150° mm, from the feeder heads which latter are arranged severally side-by-side. The feeder heads are mounted to a joint trough fed with molten glass by means of a feed channel. By a plurality of feeder heads, the drawing speed at the glass tube rod can be maintained at a low value even with a high manufacturing output. Quite generally, the process permits high efficiency, and for this reason the tubes can be produced economically.

In the process according to this invention, the tue diameter is controlled by a possible pressure difference between the interior of the glass tube and the outer wall of the glass tube. In the tube interior, atmospheric pressure prevails at all times during the drawing step. The glass tube is sealed at its frontmost end after the beginning of the drawing step, and the semi-finished glass tube is passed, after leaving the feeder head, through a pressure tank. Upon entrance of the tube into the pressure tank, the corresponding zone of the tube is still elastic whereas outside of the pressure chamber the corresponding tube zone has solidified after leaving the chamber. Thereafter, the tube can be melted off and a bottom can be formed during this step without a possibility for the thus-formed, softened tube bottom being deformed by excess pressure or vacuum. When sealing the severed tube length with a bottom, the continuous glass rod is likewise again sealed with a bottom. This bottom thereafter constitutes one of the bottoms of the tube length to be severed subsequently. In case pressure changes in the tube interior should be required at specific time intervals, these can be realized by separating the pipe from the atmosphere and connecting it with a pressure vessel, not shown, as well as by changing the pressure in this vessel. By utilizing this feature, it is possible to vary the diameter of the drawn glass tube with the drawing procedure. The drawing air can be satisfactorily shielded whereby shaping is facilitated. The total structure is simpler; the expense for the buildings wherein the process of this invention is to be conducted is lower, and placing the system back on stream after disturbances is easier.

One example of the invention will be described in greater detail below with reference to the drawings of FIGS. 1 through 16.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
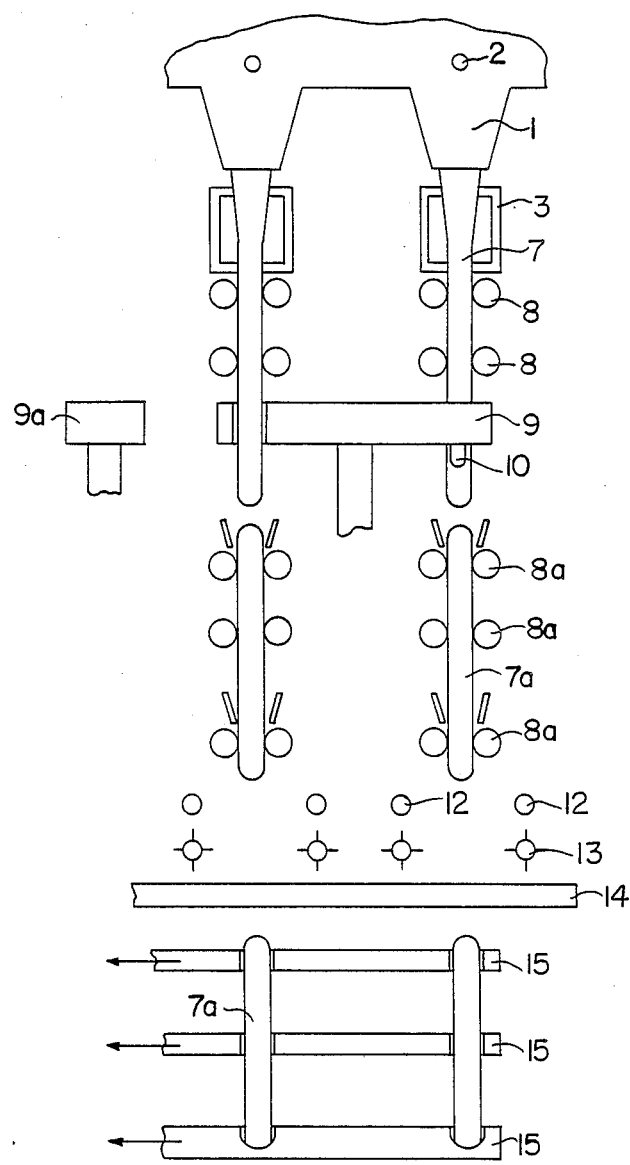
FIG. 1 is a diagrammatical side view illustrating steps for forming drawn glass tubes into ampoules.

A process will be described hereinbelow wherein the glass tube is drawn vertically downwardly. However, in principle, the tube can also be drawn upwardly. The structural design of the feeder head will then be correspondingly adapted. The tubes are taken off automatically from the drawing unit and transferred to a conveyor.

FIG. 1 shows the course of the process according to this invention in principle, the glass tube rod being drawn vertically downwardly. From the feeder head 1, the tube 7 is drawn downwardly by the rollers 8 of the drawing machine, not shown, and shaped. The diameter of the drawn glass tube is set by pulling the glass tube through a pressure tank 3 wherein an excess pressure or a vacuum prevails. The tank 3 is located below the feeder head 1 in the zone Where the glass tube 7 is still plastic. At point 2, a safety strip is fused in place, by feeding at that location a colored enamel to the feeder head 1. More details in this connection can be derived from FIGS. 2 and 3.

Figure 3:
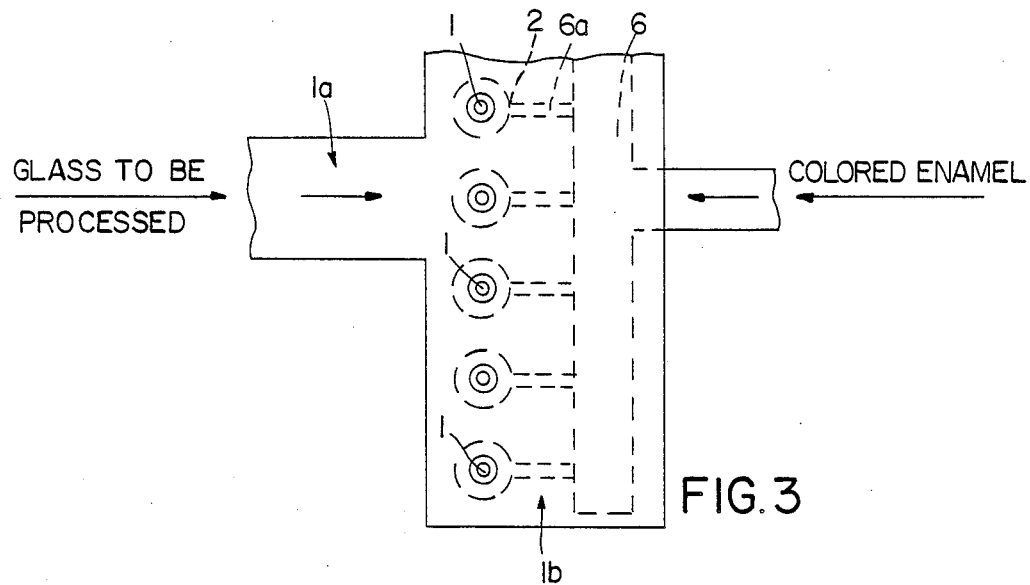
FIG. 3 is a top view, normal to FIGS. 1 and 2 illustrating the flow of both molten glass and colored enamel to the feeder head of FIG. 2.
Figure 2:
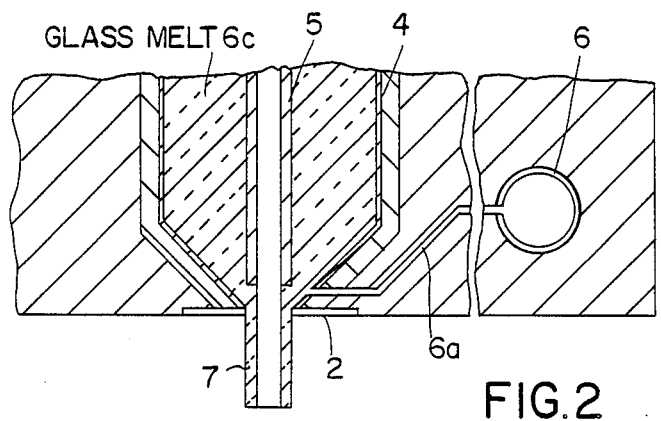
FIG. 2 is a side view in section illustrating a feeder head for forming a glass tube including a pipe for introducing enamel into the feeder head.

As is seen in FIGS. 2 and 3, the colored enamel utilized is heated in a pipe 6 to the corresponding operating temperature and introduced via a small connecting pipe 6a arranged between location 2 in the feeder head 1 and the pipe 6.

FIG. 2 shows the structure of a feeder head 1 in accordance with the invention. The feeder head is provided with a noble metal lining 4 and a pipe 5. Pipe 5, lining 4, pipe 6, and connecting pipe 6a between location 2 and pipe 6 are all made of a noble metal and can be heated electrically.

FIG. 3 shows a plurality of the feeder heads 1, arranged at a spacing of 5–15 cm and extending as orifices from a joint feeder trough 1b supplied with molten glass from a joint feed channel 1a. In the illustrated example, the glass to be processed into the glass tube 7 (FIGS. 1 and 2) is fed via the feed channel 1a from the left-hand side, and the colored enamel is fed via the pipe 6 from the right-hand side.

Figure 4:
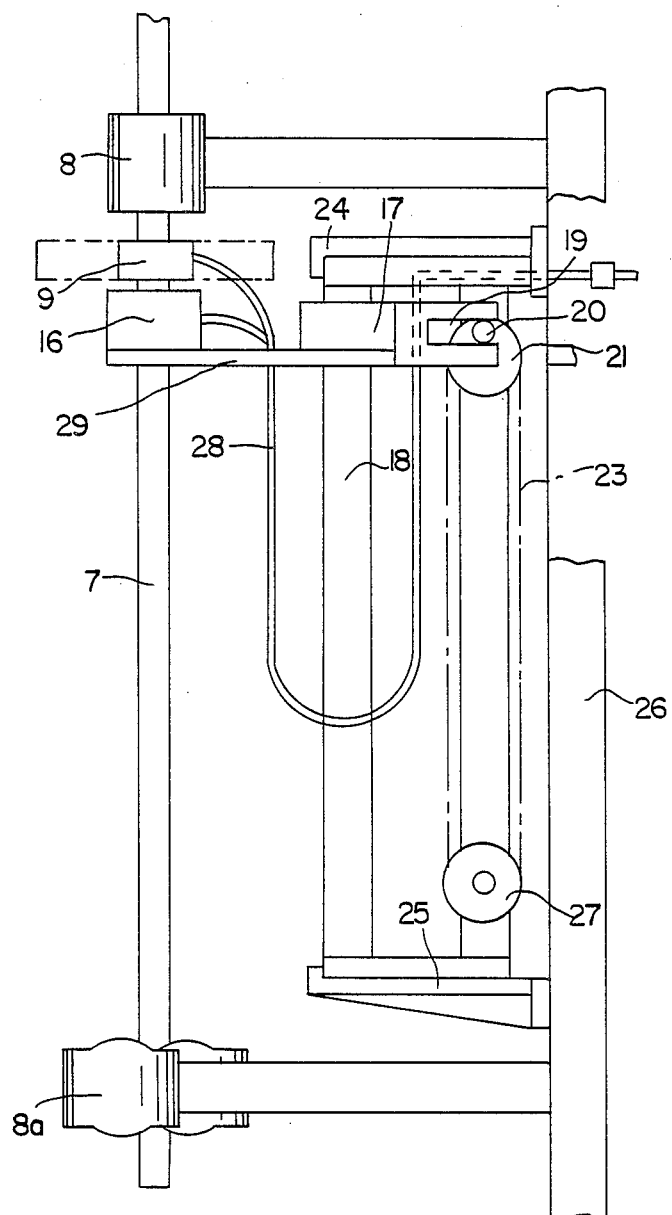
FIG. 4 is a side view showing the apparatus for positioning a burner for effecting sealing and severing of a length of the tube to form an ampoule.

Referring now more particularly to FIGS. 1 and 4, below the pressure chamber 3 at the location where the tube 7 has already solidified, sealing by melt-off and severing of the length of glass tube 7a both take place. For this purpose, a burner 9 working simultaneously on two juxtaposed glass tube rods is swung into place, and the upper burner level 30 of this burner 9 is ignited. This detail is shown in more detail in FIG. 5. As soon as the glass tube 7 has become plastic by being heated with the burner 9, it is drawn downwardly by rollers 8a by a length corresponding in its magnitude approximately to the tube diameter, and during this step is rotated about its longitudinal axis. At the same time, the burner level 31 (FIG. 5) is ignited. The tube ends of the glass tube rod 7 and, respectively, of the severed length of glass tube 7a are fused to such an extent that they are provided with a tube bottom adequate for further processing.

Figure 10:
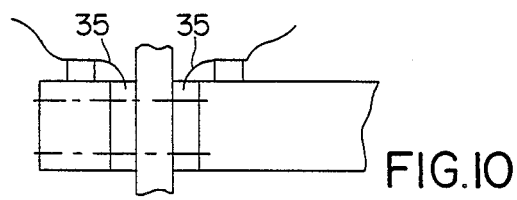
FIG. 10 is a side view showing how the tube being process is heated with electrodes.
Figure 11:
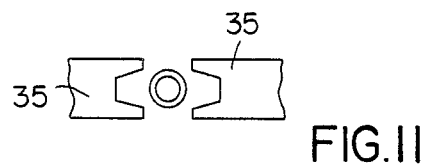
FIG. 11 is a top view of FIG. 10.
Figure 12:
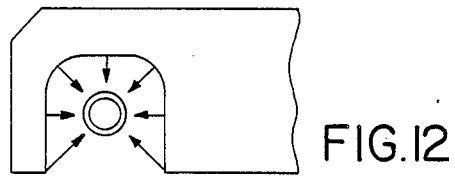
FIG. 12 is a top view illustrating how heat is applied to the tube being processed.

In order to make certain that the amount of energy required for melting off the tube length 7a from the glass tube rod 7 and for the formation of the bottoms is available, electrical energy is supplied as well by means of electrodes 35 in addition to the energy supplied by the gas, air or oxygen burner 9. These details can be seen more clearly from FIGS. 10 through 12. As shown in FIG. 11, the electrodes 35 are designed so that an electric arc is formed on the front and rear sides of the tube and consequently the tube is uniformly heated on its entire circumference. Before sealing the glass tube, a bore having a size of 2–3 mm is fused into the tube by means of a hole burner 10 attached to the burner 9.

Figure 5:
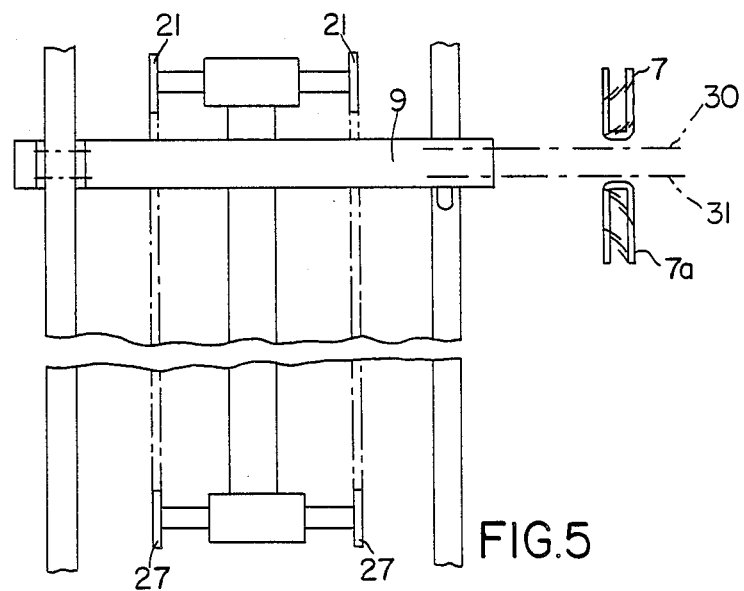
FIG. 5 is a side view illustrating how the tube is severed and sealed.
Figure 6:
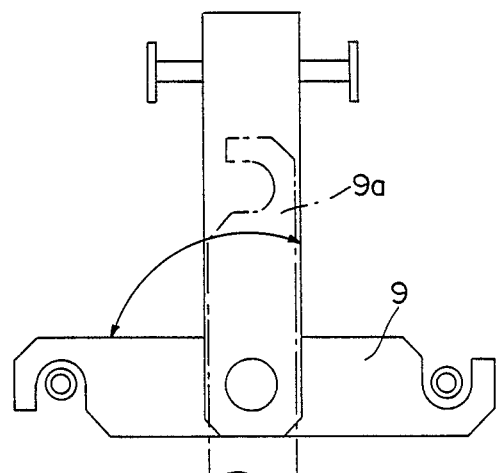
FIG. 6 is a top view illustrating how the burners of FIG. 5 pivot.
Figure 7:
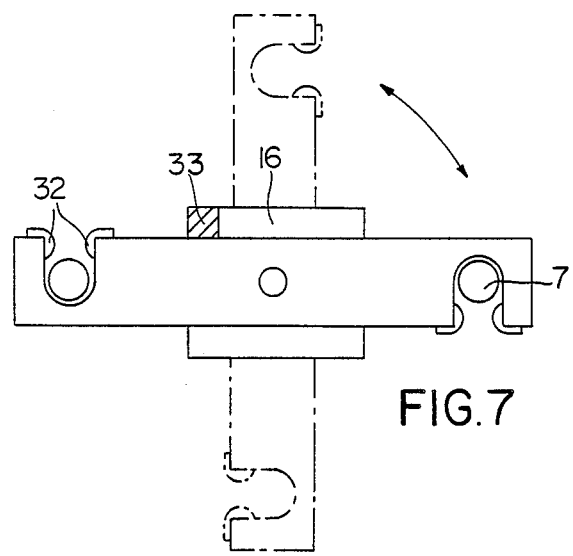
FIG. 7 is a top view further exemplary of how the burners pivot.
Figure 8:
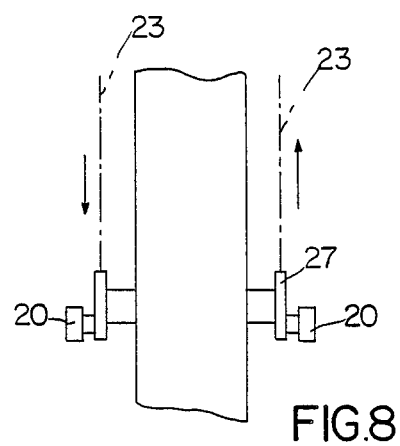
FIG. 8 is a front view normal to FIG. 4 showing rollers and chains vertically reciprocating the burners.
Figure 9:
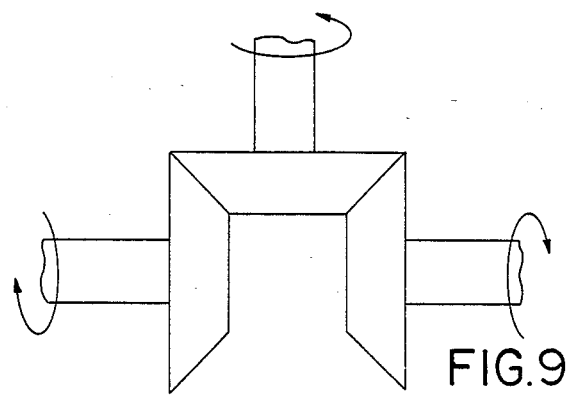
FIG. 9 is a top view showing a drive means for the chain of FIGS. 4, 5 and 8.

In order to be able to fully exploit the time available for melting off of the tube length and formation of the bottoms as well as fusion of the vent opening, the burners 9 and 9a are arranged and operated in such a way that the burner 9a in FIG. 6 is guided upwardly in a mirror-image fashion, pivoted by 90°, when the burner 9 is moved downward toward the bottom and is used for the step of sealing by melting. This downward travel of the burner 9 or 9a is performed in synchronism with the velocity of the glass tube rod 7. As can be seen from FIG. 7, resilient holders 32 are mounted to the burners 9, 9a in such a manner that they guide the glass tube rod 7 loosely. Pivoting of the burner 9 or 9a takes place by revolving cylinder 16 and is limited by a stop 33. These details can be derived from FIG. 4 and FIG. 7. The burners 9 and 9a, respectively, are driven by a chain 23 (see FIG. 4); the movement of the chain 23 is synchronous with the movement of the glass tube rod 7. Rollers 20 are arranged at the chain 23; when the chain 23 is guided over a roller 21, these rollers 20 enter a slot 19, thereby moving a base plate 29 attached to a support 17 downwardly by way of a ball slide 18. In the lower position, the roller 20 enters the slot 19 at the point of reversal of the lower roller 27 and at this point in time moves the burner 9 upwardly. The drive means for the chain 23 is shown in FIGS. 4, 5, 8, as well as 9. The ball slide 18 is attached to a frame 26 by way of holders 24 and 25. The energy for the burner 9 or 9a, as well as the pivoting cylinder 16 is supplied via a cable line 28. This supply involves gas, oxygen, air and electrical current.

Figure 14:
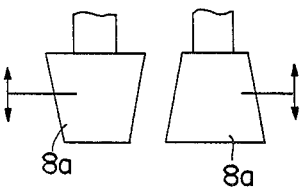
FIG. 14 is a top view showing conical rollers being axially shifted to twist the tube.
Figure 15:
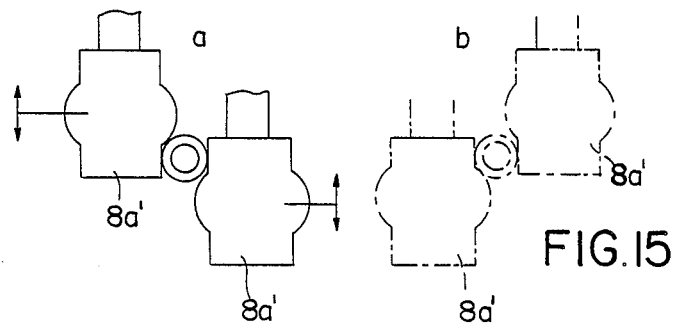
FIG. 15 is a top view showing in solid lines one position of a pair of bumped rollers which, when shifted to a dotted line position, twist the tube.

As illustrated in FIG. 1, the severed length of tube 7a is drawn from the glass tube rod 7 by a certain measure in the way described above, and then moved on at the same speed as the tube rod 7. Drawing off takes place by a mutual shifting of the conveyor rollers 8a in their longitudinal axis. The rollers 8a are either conical, as shown in FIG. 14, or they are designed in their center with a larger diameter, as can be seen from FIG. 15. By shifting the rollers 8a from the position a shown in FIG. 15 into position b, the tube length 7a present between these rollers 8a briefly enters the zone having the large diameter and is thereby moved faster.

Figure 13:
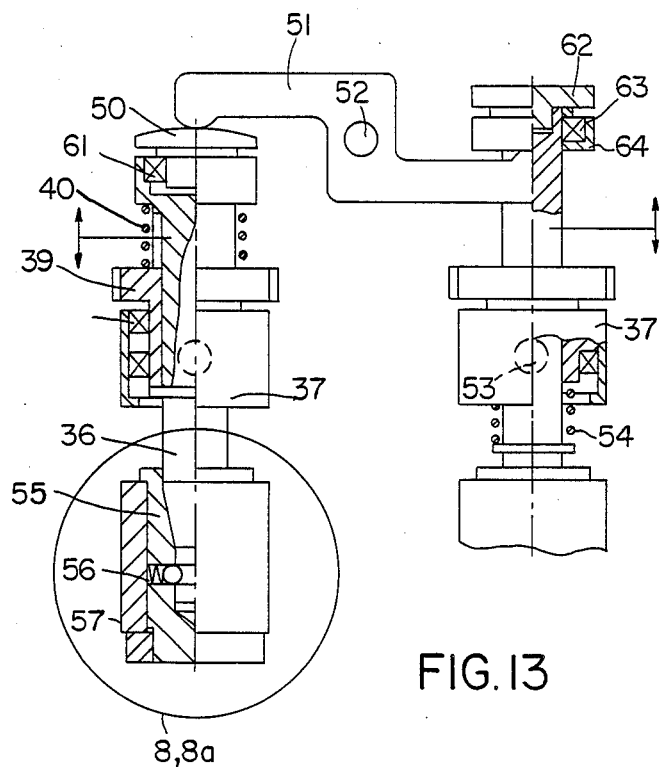
FIG. 13 is a top view, partially in section, showing an operating mechanism for shifting rollers which both advance and intermittently twist the rube being processed.

FIG. 13 illustrates how the shifting takes place, namely by a lever 51 supported in a fulcrum 52 and driven by a revolving cylinder, not shown herein. The time period for the mutual shifting of the rollers 8a can be set and thereby the distance of the two tube ends, i.e., of the end of the severed tube length and of the beginning of the continuous glass tube rod, can be determined. The structure of the drive rollers 8, 8a can likewise be seen from FIG. 13. The roller 8 and, respectively, 8a, is tightened on a bolt 36. The roller consists of a cone 55 and a drawing liner 56 and is retained at a bolt 36 by means of a ball detent 57. The bolt 36 is driven by way of a gear wheel 39 and is supported in a bearing 38 within a housing 37. At the end of the bolt 36 lying in opposition to the roller, a cap 50 is attached by way of a bearing 61. The bolt of a neighboring roller is provided with a somewhat differently designed cap 62 and a ring 64. The ring 64 is connected by way of a bearing 63 with the bolt 36 of this neighboring roller. Shifting of both rollers takes place as described above by the feature that the rotary lever 51 presses on the cap 50 and the ring 64 and, by a brief rotation, moves the two roller axles. The resetting of the two rollers takes place by means of springs 40 and 54.

Figure 16:
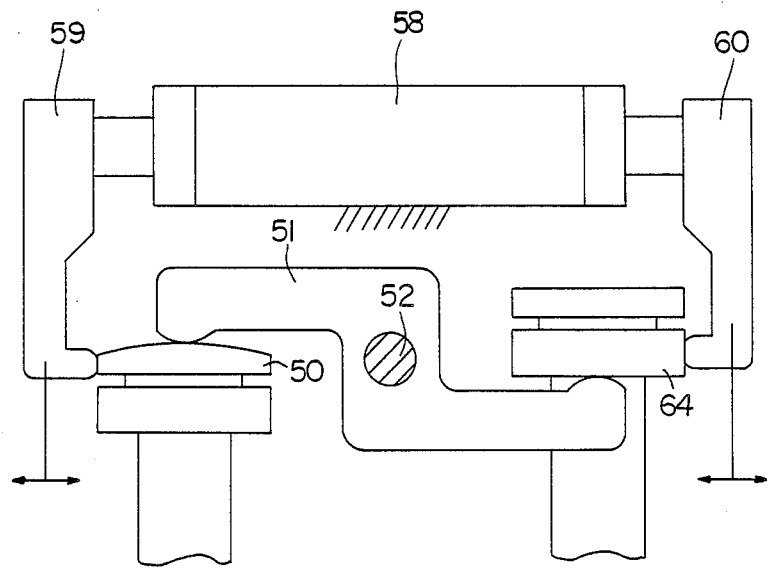
FIG. 16 is a top view showing a mechanism for swinging rollers away from the tube.

The rollers 8, 8a can be swung away from the tube drawing unit. For this purpose, the bearing housing 37 is rotatably supported on the bolt 53. For the swinging-out operation, the levers 59 and 60 shown in FIG. 16 are urged by a cylinder 58 against the rotatably mounted cap 50 and the rotatably mounted ring 64 and thereby the rollers are swung out by a sufficient angle.

In case of disturbances at the tube drawing unit, the rollers 8 and 8a are swung outwardly and the additional rollers 12 are swung inwardly, these latter rollers being illustrated in FIG. 1. Subsequently, shard crushers 13 and a shard discharge chute 14 are also placed into the appropriate operating position, and the shards produced in the drawing unit are removed therefrom. During normal production, the rollers 12, the shard crushers 13, and the shard discharge chute 14 are not functioning. During regular operation, the severed tube length 7a is picked up by the conveyor 15 and carried away.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for vertically drawing at least one glass tube to fabricate the tube into a plurality of tubular articles with closed ends, the process comprising the steps of:

forming a continuous glass tube with a closed end from glass in a plastic state by advancing molten glass through a feeder head;

maintaining atmospheric pressure within the glass tube as the glass tube advances while in a plastic state;

passing the glass tube through a pressure tank while subjecting the glass tube to a defined pressure different from atmospheric pressure;

drawing the glass tube while in a non-plastic state from the pressure tank;

dividing the glass tube into selected lengths to form the tubular articles by intermittently heating the glass tube at a selected location as the glass tube advances to sever the glass tube while simultaneously fusing the glass thereof to seal the end of the glass tube while forming an article sealed at both ends.

2. The process according to claim 1, wherein a safety strip is incorporated by melting pigment into the glass tube within the feeder head.

3. The process according to claim 1, wherein several glass tube are drawn and formed into articles simultaneously.

4. The process according to claim 1, wherein the pressure to which the pressure tank is exposed deviates exceeds from atmospheric pressure.

5. The process according to claim 1, wherein the pressure in the pressure tank is varied to regulate the diameter of the drawn glass tube.

6. The process according to claim 1, wherein the glass tube rod is drawn vertically in an upward direction.

7. The process according to claim 1, wherein the glass tube is drawn vertically in a downward direction.

8. The process according to claim 1, wherein, prior to sealing the glass tube at the bottom thereof, a small bore is fused therein length.

9. An apparatus for processing glass into glass tubes with closed ends, the apparatus comprising:

a vessel (1b) provided for receiving molten glass (6c);

at least one feeder head (1) within the vessel which feeder head has a tapered outlet orifice;

a pipe (5) extending through the interior of the feeder head and opening just upstream of the outlet orifice, the feeder head (1) being arranged in the vessel (1b) sc as to open vertically wherein a glass tube rod (7) can be drawn vertically out of the molten glass (1c) from the vessel (1b) through the feeder head (1), each feeder head (1) being connected in the proximity of its outlet orifice via a connecting pipe (6a) with a pipe (6) holding a molten coloring component;

a pressure tanks positioned adjacent the feeder head downstream thereof;

at least one pair of rollers (8) downstream of the pressure tank for engaging and moving the drawn tube rod downward;

a burner system (9) downstream of the rollers, which burner is moveable along with the vertically continuously drawn glass tube rod (7) over a certain distance in synchronism; and several rotatable roller pairs (8a) arranged downstream of the point of maximum vertical movement of the burner (9), the roller pairs (8a) being designed to exert differing vertical speeds on the glass tube rod while the rotational speed of the roller pairs (8a) remains the same.

10. The apparatus according to claim 9, wherein the burner system (9) is a burner, rotatable about 90°, which burner has means for heating two tube rods simultaneously.

11. The apparatus according to claim 9, wherein the burner system (9) has means to provide a first heating level (30) and a means to provide second heating level (31) spaced from the first heating level (30).

12. The process of claim 1, wherein the step of intermittently heating the glass tube is performed with a burner which burns a mixture of fuel gas, air and oxygen.

13. The apparatus according to claim 12, wherein the burner system (9) is additionally equipped with electrodes (35) for heating the tube rod (7) with maximum uniformity over its entire circumference.

14. The apparatus according to claim 9, wherein the burner system (9) additionally includes an orifice burner (10).

15. The apparatus according to claim 9, wherein the feeder head (1), the pipe (5), the pipe (6). as well as the connecting pipe (6a) have internal linings made of a noble metal which can be electrically heated.

16. The apparatus according to claim 9, wherein the apparatus includes several feeders heads (I) having a pipe (6) common to all feeder heads (1), the pipe being connected respectively via connecting pipes (6a) with the respective feeder heads (1).

* * * * *